US012654135B2

(12) United States Patent
Sinha Ray et al.

(10) Patent No.: US 12,654,135 B2
(45) Date of Patent: Jun. 16, 2026

(54) NANOPARTICLE FILTRATION MEMBRANE AND THE MANUFACTURING METHOD THEREOF

(71) Applicant: Cabomba LLC, Grayslake, IL (US)

(72) Inventors: Suman Sinha Ray, Akron, OH (US);
Kumar Natesaiyer, Grayslake, IL (US);
Sumit Sinha Ray, West Bengal (IN);
Terry Rosenstiel, Vernon Hills, IL (US)

(73) Assignee: CABOMBA LLC, Grayslake, IL (US)

( * ) Notice: Subject to any disclaimer, the term of this patent is extended or adjusted under 35 U.S.C. 154(b) by 644 days.

(21) Appl. No.: 18/169,899

(22) Filed: Feb. 16, 2023

(65) Prior Publication Data

US 2023/0264147 A1 Aug. 24, 2023

Related U.S. Application Data

(60) Provisional application No. 63/312,754, filed on Feb. 22, 2022.

(51) Int. Cl.
B01D 61/02 (2006.01)
B01D 67/00 (2006.01)
B01D 69/02 (2006.01)

(52) U.S. Cl.
CPC ....... B01D 61/027 (2013.01); B01D 67/0027 (2013.01); B01D 69/02 (2013.01); *B01D 2323/35* (2013.01); *B01D 2325/04* (2013.01)

(58) Field of Classification Search
CPC ............ B01D 61/027; B01D 67/00042; B01D 67/0027; B01D 69/02; B01D 46/00; B01D 46/02
See application file for complete search history.

(56) References Cited

U.S. PATENT DOCUMENTS 8,282,873 B2 10/2012 Barinov et al.
8,523,971 B2* 9/2013 Leung ................ B01D 39/2055
55/528

(Continued)

FOREIGN PATENT DOCUMENTS

EP 2045375 B1 3/2011
EP 2321029 B1 2/2016

(Continued)

OTHER PUBLICATIONS https://www.fortunebusinessinsights.com/protective-face-mask-market-103292; "Protective Face Mask Market Size, Share & COVID-19 Impact Analysis, by Product (Medical Face Mask (Surgical & Procedure, N-95 Respirators, and Others), by Usage (Disposable and Reusable), and by End-use Industry (Healthcare, Oil & Gas, Mining, Construction, Manufacturing, and Others), and Regional Forecast 2022-2029"; published Jul. 2022.

(Continued)

*Primary Examiner* — Sharon Pregler
(74) *Attorney, Agent, or Firm* — Wentsler LLC

(57) ABSTRACT

The present innovation relates to novel and versatile nano-membrane to be used in filtration system and manufacturing method to produce it. The filter membrane may result in significant reduction in energy demand and higher capture efficiency. The filter membrane may have one or multiple nanomembrane part of overall filtration system. The manufacturing uses a combined electric and air flow field to produce the nanomembrane, which may be included as in-line module in standard filter manufacturing process. The method of nanomembrane production is optimized by machine learning-based optimization protocol based on physics-based modeling via feedback control.

5 Claims, 3 Drawing Sheets

(56) References Cited

U.S. PATENT DOCUMENTS

| | | | |
|---|---|---|---|
| 9,194,058 B2 | 11/2015 | Sharma et al. | |
| 9,469,920 B2 | 10/2016 | Lee et al. | |
| 10,876,223 B1 | 12/2020 | Haff | |
| 2018/0045423 A1* | 2/2018 | Baelden | F24F 12/00 |
| 2019/0160404 A1 | 5/2019 | Smithies | |

FOREIGN PATENT DOCUMENTS

| | | |
|---|---|---|
| KR | 20130039648 A | 4/2013 |
| KR | 101291592 B1 | 8/2013 |

OTHER PUBLICATIONS http://www.oecd.org/coronavirus/policy-responses/the-face-mask-global-value-chain-in-the-COVID-19-outbreak-evidence-and-policy-lessons-a4df866d/; "The face mask global value chain in the COVID-19 outbreak: Evidence and policy lessons"; May 4, 2020.

https://www.fortunebusinessinsights.com/industry-reports/air-filters-market-101676; Air Filters Market Size, Share & COVID-19 Impact Analysis, by Type (Cartridge Filters, Dust Collectors, HEPA Filters, Baghouse Filters and Others), by End-User (Residential, Commercial, and Industrial) and Regional Forecast, 2022-2029; published Mar. 2022.

https://www.grandviewresearch.com/industry-analysis/us-air-purifier-market; "U.S. Air Purifier Market Size, Share & Trends Analysis Report by Technology (Activated Carbon, HEPA, Ionic Filters), by Application (Commercial, Residential, Industrial), and Segment Forecasts, 2020-2028"; Oct. 2021.

https://www.reportsanddata.com/report-detail/ultrafiltration-market; "Ultrafiltration Market Size, Share, Trends, by Type (Polymeric, Ceramic), by Module (Hollow Fiber, Plate and Frame, Tubular, Others), by Application (Municipal Treatment, Industrial Treatment, Food and Beverage Processing, Others), and by Region Forecast to 2030"; Published May 2022.

http://css.umich.edu/factsheets/us-wastewater-treatment-factsheet; Center for Sustainable Systems, University of Michigan; "U.S. Wastewater Treatment Factsheet"; Pub. No. CSS04-14; Sep. 2022.

https://www.watertechonline.com/wastewater/article/15547515/what-is-ultrafiltration-and-what-are-ultrafiltration-processes-in-wastewater; "What is ultrafiltration and what are ultrafiltration processes in wastewater?"; Daniel Theobald, Feb. 27, 2015.

Journal of Membrane Science vol. 485, Jul. 1, 2015, pp. 132-150, "Application of solution-blown 20-50 nm nanofibers in filtration of nanoparticles: The efficient van der Waals collectors"; Sumit Sinha-Ray, Suman Sinha-Ray, Alexander L. Yarin, Benham Pourdeyhimi.

* cited by examiner

NANOPARTICLE FILTRATION MEMBRANE AND THE MANUFACTURING METHOD THEREOF

This application claims the benefit of U.S. provisional patent application Ser. No. 63/312,754, filed Feb. 22, 2022.

BACKGROUND OF THE INVENTION

The present innovation deals with nanomembrane-based filters and the method of manufacturing it at industrial scale to make it price competitive with traditional filters.

The overall filtration market can be broadly divided into two categories:

(a) fluid filtration (e.g.—dairy, beverage, wastewater, pharmaceutical etc.)

(b) air filtration (e.g.—HVAC, PPE etc.).

Filtration is employed in a variety of industries, from creating safe product, like drinkable milk, to concentrating high value product, as in cheese production. As an example, in the dairy industry, ultrafiltration is used for a wide range of applications, such as protein standardization of cheese milk, fresh cheese production, protein concentration, and decalcification of permeates, as well as lactose reduction of milk. One startling fact is that 12% of US energy consumption is dedicated to thermal separations, which amounts to not only being an impediment to energy independence but also to being a high source of greenhouse gas emission.

While on the surface the filtration processes may seem different, they suffer from similar pain points.

The biggest pain points in filtration processes are:

(a) A general difficulty to efficiently capture a broad range of particulate sizes (especially nanoparticulates of diameter ≤400 nm) at scale, (b) The need for extremely thick filter media to capture nano-particulates that result in high pressure drops and reduced throughput, creating expensive, energy intensive, inefficient filtration processes.

A common place example of above pain points can be seen in the difference between N-95 and surgical masks, which was felt during pandemic, where it was found that N-95 masks are more effective than traditional surgical masks. One key differentiator in the construction of N-95 and regular surgical mask is the higher thickness in N-95 masks. In spite of being effective to capture COVID-19 virus, it makes it difficult to breathe through it.

The global face mask market in 2019 was US$1.22 billion and expected to grow to $3.59 billion by 2027, with an estimated annual growth (CAGR) of 7.1% during that time. The U.S. market was US$471 million in 2019 and will nearly triple by 2027. According to the World Health Organization (WHO), approximately 89 million medical masks will be required on a monthly basis.[1]

The ongoing COVID crisis created an immediate need for innovation in the personal protective gear industry. This need goes beyond just the requirements for emergency services personnel and includes the needs of the general population. This is not only a consequence of personal choice but is also due to regulatory compliance in individual states in the U.S. regarding wearing of face masks in public places, which heightens this demand. Given that the expected vaccine will not be publicly available in volume until 2021, the demand on face mask products for personal health reasons will continue to rise in the immediate future.

It is common to use surgical masks and N95 respirators in the event of respiratory pandemics. Surgical masks trap sprays & droplets from coughing & sneezing, while N95 respirators offer protection from smaller airborne particles. In essence surgical masks protect others from the wearer, while N95 respirators protect the wearer from others. Both are disposable, as higher probability of contamination occurs with re-usability. This is why demand is high and shortages occur.

It is important to note here that, under present conditions, no single country can meet the increased demand for face masks alone by itself. Even trade among countries still does not supply enough masks in a pandemic of this magnitude to solve the shortage. In some manner, a significant increase in both the production and distribution of face masks must be found for future outbreaks.[2]

Separate from the present COVID situation, in terms of personal protection, the face mask segment is affected by a variety of demographics, which include the aging global population. With longevity comes a tendency for health conditions where respiratory ailments cause susceptibility to issues with air quality. Today, there are more than 46 million older adults age 65 and older living in the U.S. By 2050, that number is expected to grow to almost 90 million. Thus, mask demand for this segment will continue to increase.

Other scenarios remain, which add to the demand for face masks. The construction trades remain as a stalwart for mask usage, and that demand will continue to rise with increasing awareness regarding respirable dust protection. Issues related to air quality represent another impactful driver, especially in Asia. Due to industrial pollution and cedar pollen contamination in certain regions of Japan, people there buy $230 million in surgical masks each year. China and Korea, with their industrial surges and resultant air pollution, echo that demand and have also adopted the practice of wearing masks.

The global air filter market in 2019 was US$12.10 billion and expected to grow to $20.63 billion by 2027, with an estimated growth (CAGR) of 6.9% during that time.[3] The U.S. air purifier market was estimated at US$1.75 billion in 2019, with a forecast annual growth rate (CAGR) of 12.4% from 2020 to 2027. The HEPA segment held the largest market share of that market of over 35% in 2019.[4]

HEPA is an efficiency standard for air filters. It stands for High-Efficiency Particulate Air. Usual standards in the U.S. require that a HEPA air filter removes at least 99.97% of particles whose diameter is equal to 300 nm or above. The fibers used in HEPA filters usually have diameters between 500 and 2000 nm.

Key factors affecting filtration efficiency include fiber diameter, filter thickness, and face velocity. However, HEPA filters struggle with capturing particle diameter less than 300 nm diameter. However, most of the disease-causing particles (e.g. virus, VOCs) are in this size range. This grade of filter is commonly used by hospitals, large facilities and thereby substantiates need for an effective filter.

Commercial application segment market share was over 70% in 2019, with an estimated CAGR of 12.1% from 2020 to 2027 in revenue. Air purifiers are used to maintain indoor air quality standards in general and for meeting high purity standards for clean room applications. The commercial segment remains the target of largest opportunity[4].

The ultrafiltration market is projected to grow at a rate of 15.3% in terms of value, from US$1.13 Billion in 2019 to reach US$3.51 billion by 2027. Ultrafiltration is a pressure-driven purification process in which water and low molecular weight substances permeate a membrane while colloids, particles, and macromolecules are filtered.[5]

The growth in global population drives the demand for clean water, which in turn promotes demand for efficient water treatment processes. People are growing more concerned about disease spread, in both air and water systems. Add to that the continued growth of the bottled water & beverage markets and increasing stress on water treatment efficiencies can be easily seen.

Even apart from personal water usage and the current attention to disease due to COVID, there is a constant and increasing demand for recycled water in industry. This includes cooling tower feed water, washing of equipment, fire protection reservoirs, process water and dust control, not to mention toilets. In all, demand for increasing amounts of cleansed water and the related added stress on wastewater treatment efficiency will continue to drive demand for ultrafiltration (UF) systems.

UF is often used for removal of particulates and macromolecules to produce potable water. It can used to replace existing secondary & tertiary filtration systems in water treatment plants or as a modular standalone system for more rural municipalities. When treating water with high suspended solids, UF processes are preferred for the following reasons:

No chemicals required (aside from cleaning)
Constant product quality regardless of feed quality
Compact plant size
Capable of exceeding regulatory standards of water quality (90-100% pathogen removal)

When water recycling is simple, it often needs very little processing. However, when more intensive processing is required, the industry standard procedures include using UF.[7]

As far as a potential customer base is concerned, there are 14,748 privately owned treatment works (POTW) in the United States. Since about 2% of total U.S. electricity usage is consumed by pumping and treating water & wastewater, any significant reduction in backpressure caused by the filtration process has a major impact on the energy costs for these utilities.[6] Other industries, which use large amounts of water and/or have toxic effluents, also use ultrafiltration systems. These include the chemicals, steel, plastics & resins, paper & pulp, pharmaceutical and the food & beverage industries, including soft drinks & canned foods, as well as power, and water & wastewater treatment plants.[7]

These are some of the examples. In summary, fluid filtration (both air and liquid) suffer from these challenges. Nanofiber-based filters were also proposed[8-10]. However, electrospun nanofiber filters suffer from the challenges mentioned above. In a recent publication[11], it was shown theoretically that that filter membranes with diameter ≤100 nm can capture nanoparticles using van der Waals force. Electrospinning is one of the preferred methods for producing nanofibers[12,13]. However, electrospinning is not capable of producing nanofibers of diameter ≤100 nm consistently. In a recent patent[14], a electrospinning device to produce nanofibers of diameter ≤100 nm was proposed but it is limited by production capacity to industrial scalability suitable for filtration, supersonic air flow field and lack of intelligent control with closed loop feedback system to optimize based on need and adaptability to intended filter manufacturing.

SUMMARY OF THE INVENTION

The invention provides a layered filter membrane system that improves upon present filtration system, where one or more nanomembranes with fiber diameter ≤100 nm is being embedded, sandwiched and/or coaterd, with other porous traditional filter members (e.g.—nonwoven, porous sheets etc.). The nanomembrane coating thickness<500 nm. The ultrafine diameter and ultrafine thickness allows the filtration resulting filter member stay relatively open and yet have higher capture rate resulting in 20-50% higher capture efficiency because of the following. During filtration, fluid streamlines carrying nanoparticles get displaced by fibers in filter media, which is of the order of fiber diameter. Ultrafine nanofibers in the present filter displaces streamlines minimally. Thereby enabling attractive van der Waals force (short range force) to capture particles. This increases capture efficiency. The surface area to volume ratio of the ultrafine nanofiber is extremely high. This increases the probability of interaction between particles and ultrafine nanofibers even in few monolayer thickness (~100-400 nm). This small thickness ensures the volumetric porosity of the ultrafine nanofiber coating remains high and thus the additional pressure drop is negligible. The present solution is able to produce an industrially scalable filtration mat that can significantly enhance filtration efficiency (especially diameter ≤400 nm) at low energy demand and high throughput. The nanomembrane can be made from wide range of polymers that can be dissolved in a solvent and results in optimal viscoelasticity (e.g.—nylon, polyvinyl alcohol, PET, PVDF etc.).

In an embodiment, nanomembrane layer is sandwiched between multi-layer traditional filtration medium. There can be a single or multiple layer of nanomembrane. The overall volumetric porosity of the resultant filtration membrane remains open compared to traditional filter.

In another embodiment, nanomembrane layer can be applied as coating to the traditional filtration medium. The filter membrane may or may not have other nanomembranes sandwiched between other components of the filtration medium.

In an embodiment, the resultant filtration system can be used as a sheet that can be cut or shaped in a variety of shapes. The filtration system can also have variety of geometrical structure (namely—cylindrical, circular etc.).

The invention also provides a method comprising application of nanomembrane directly on collector medium used in filtration by using a rotating cylinder that picks up polymer solution and uses a combination of high voltage electric field and high-speed air jet (both subsonic and supersonic), where the cylinder is connected to high voltage electric source and the air source is connected to ground. The cylinder may have different topological pattern. The cylinder may have smooth exterior. This results in capillary instability, which issues polymer jet that results in nanofiber diameter ≤100 nm. The as collected nanomembrane may not require any further chemical and/or thermal treatment as high van der Waals force results in extreme adherence to the collector medium.

The invention also provides a method comprising application of nanomembrane directly on collector medium used in filtration by using a collection of sharp needles in polymer solution bath that picks up thin layer of polymer solution and uses a combination of high voltage electric field and high-speed air jet (both subsonic and supersonic), where the needles are connected to high voltage electric source and the air source is connected to ground. This results in capillary instability, which issues polymer jet that results in nanofiber diameter ≤100 nm. The as collected nanomembrane may not require any further chemical and/or thermal treatment as high van der Waals force results in extreme adherence to the collector medium.

The invention also provides a method comprising application of nanomembrane directly on collector medium used in filtration by using a specially designed head that can have—(a) patterned opening without any needles, or (b) multiple needles issuing polymer solution or (c) oscillating stoppers capable of closing and opening slot. The head will issue polymer solution and use a combination of high voltage electric field and high-speed air jet (both subsonic and supersonic), where the cylinder is connected to high voltage electric source and the air source is connected to ground. This results in nanofiber diameter ≤100 nm. The as collected nanomembrane may not require any further chemical and/or thermal treatment as high van der Waals force results in extreme adherence to the collector medium.

The method also provides a method of using a plug and play solution, where any of the above-mentioned method or a combination of them can be used asynchronously or synchronously to deposit the nanomembrane layer on collector of different shapes and size.

The invention also describes a physics-based machine learning model that learns from the output of the manufacturing process and optimizes the parameters to improve the parameters of the process.

DESCRIPTION OF THE PREFERRED EMBODIMENTS

Figure 1:
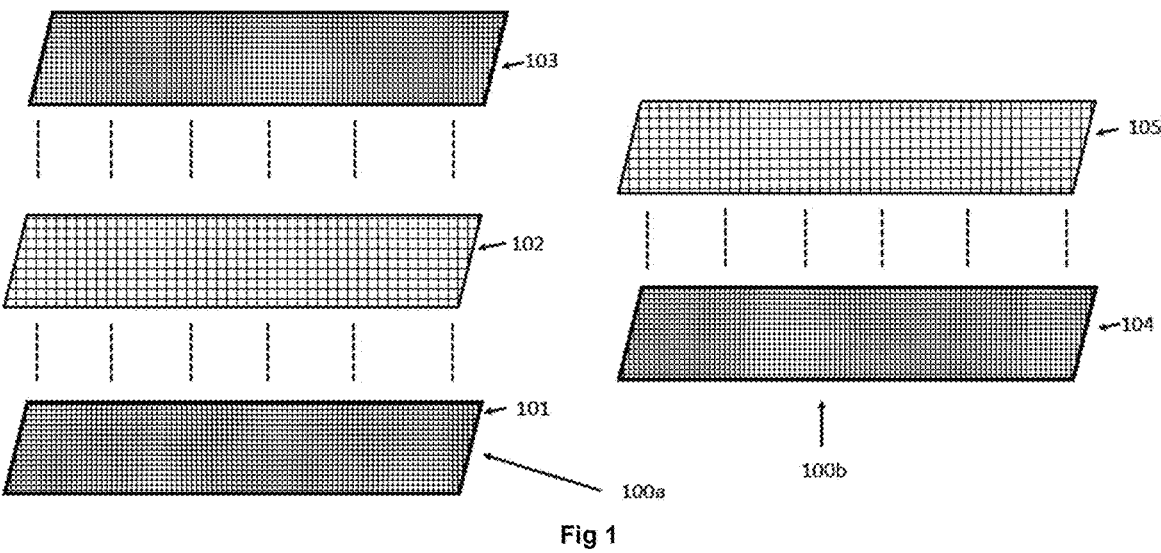
FIG. 1 illustrates two different configurations of the filter assembly.

The present invention relates to nanomembrane enhanced filter and the methods of producing them. More specifically FIG. 1 shows two examples of filter configurations with the nanomembranes. 100*a* and 100*b* shows two possible examples of embedding one or multiple layers of nanomembrane. 100*a* shows the nanomembrane being sandwiched between multiple layers of filter membranes. The overall filter membrane is a n layer membrane, where n≥3. 101 is the first traditional filtration layer in a filter, 102 is the nanomembrane layer, which is the m-th layer, 103 is n-th traditional filtration layer in the overall filtration, where 1<m<n. 100 *b* shows the configuration, where the nanomembrane is applied as a coating to the filtration membrane, where 104 is first layer in a filter, 105 is m-th nanomembrane layer and m≥3. In the examples, only 1 active layer is shown. However, in reality, there can be multiple layers of nanomembrane that are part of the overall filtration assembly/system. These filtration systems may be used in the form of sheets. They may also be cut, formed and shaped into other shapes. The nanomembrane layer may be applied on other shapes (e.g.—tubes). The nanomembrane layer has very high van der Waals force, which allows it to stick with any surface. This allows that the nanomembrane layer may not require any further treatment (e.g.—thermal and/or chemical) for attachment and can be used as an inline process. The nanomembrane layer may not exceed thickness of 500 nm and the fiber diameter may not exceed 100 nm. Plurality of polymers can be used to create the nanomembrane layers, which are optimized by polymer properties, namely—viscoelasticity, glass transition temperature ($T_g$), solubility etc. Examples of some polymers are, but not limited to, PVA, nylon, PET, PVDF etc. In some cases polymer derived secondary materials may also be used, where polymers act as carrier materials to create secondary material following chemical and/or thermal treatment. Some examples, but not limited to are creation of ceramic nanofibers, where precursor materials (such as—alkoxide, orthosilicates etc.) may not have enough viscoelasticity but can be mixed with polymeric materials to created composite nanofibers, which on further treatment will result in ceramic nanomembrane.

Figure 2:
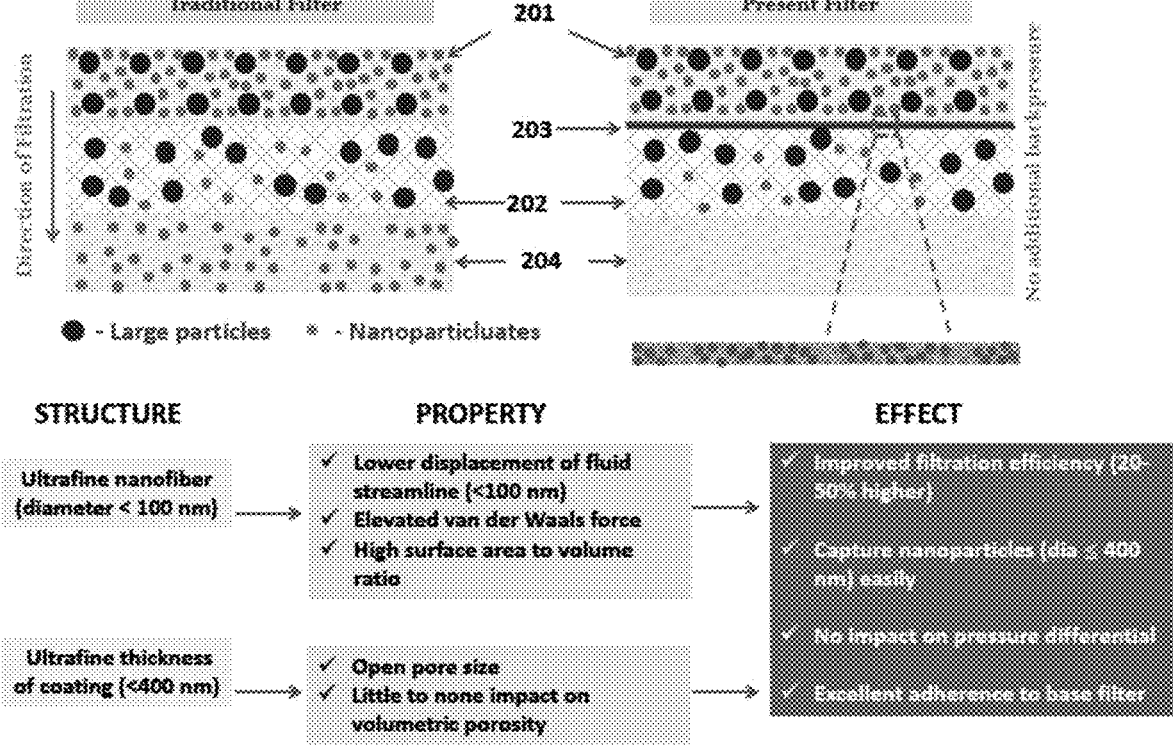
FIG. 2 illustrates schematics of comparison of filtration system between standard filter and the present filter. It also illustrates the structure-property-process map of present filtration system.
Figures 3, 4:
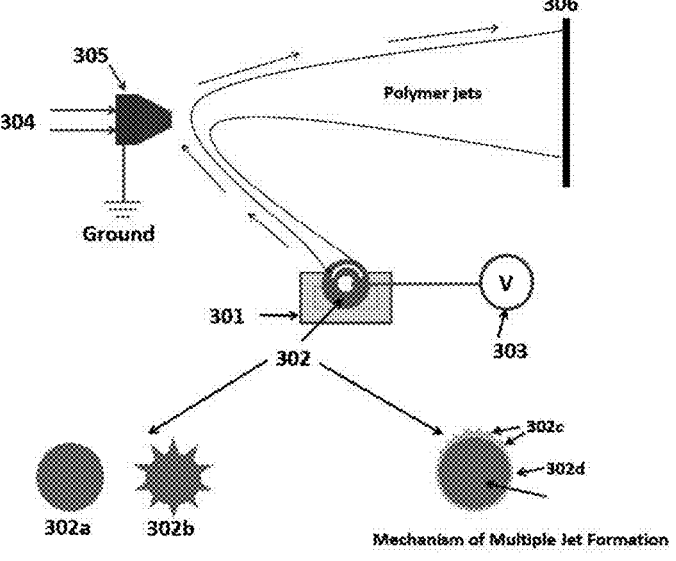
FIG. 3 illustrates an example of nanomembrane production system, where the polymer jet issues from a cylinder submerged in polymer solution bath. Two different examples of cylinder exterior are shown. The underlying mechanism of jet formation, capillary instability is shown.
FIG. 4 illustrates an example of nanomembrane production system, where the polymer jet issues from needles submerged in polymer bath is shown.

FIG. 2 shows a schematic of comparison of traditional vs present solution. Here 201 is the unfiltered fluid, 202 is traditional filter media, 203 is nanomembrane coated on traditional filter and 204 is filtered fluid. As shown in FIG. 2, the present nanomembrane layer doesn't create any additional backpressure but increases capture efficiency. This may translate into more open base filter resulting in higher volumetric porosity at a higher capture rate of small nanoparticles (diameter ≤400 nm) and thereby increased filtration efficiency both from the viewpoint of capture rate and energy demand. FIG. 3 explains the overall structure-property-effect relationship. The physics behind this can be explained as the following. Theoretically, the second law of Newton for an individual nanoparticle/nanoparticle cluster interacting with individual fiber of a filter reads as $$\left(m_p + \frac{m_\ell}{2}\right)\frac{dv_j}{dt} = \tag{1}$$

$$-\frac{Aa_p}{6(a_p + a_f)}\frac{1}{\left(x_p^2 + y_p^2\right)^{1/2}}(i\cos\theta + j\sin\theta) - 6\pi\mu a_p/(v_p - v)$$

where A>0 is the Hamaker constant, and the force is attractive, $v_p$ is the nanoparticle velocity, $m_p$ is its mass, $m_i$ is the mass of liquid displaced by the nanoparticle, and the last term of the right-hand side is the Stokes drag force, with p being the liquid viscosity. Note also, that in Eq. (1) $\cos\theta = x_p/(x_p^2 + y_p^2)^{1/2}$ and $\sin\theta = y_p/(x_p^2 + y_p^2)^{1/2}$.

The momentum balance equation (1) is supplemented by the kinematic equation $$\frac{dR_p}{dt} = v_p \tag{2}$$

for the position vector of the virus/virus cluster $R_p = ix_p + jy_p$. Numerical solution will show that nanoparticle suspension (400 nm) interacts with nanofiber diameter ≤100 nm, the capture efficiency increases drastically in comparison to larger fibers. For the sake of brevity, it can be summarized as the following. during filtration, fluid streamlines carrying nanoparticles get displaced by fibers in filter media, which is of the order of fiber diameter. Nanomembranes described here displaces streamlines minimally. Thereby enabling attractive van der Waals force (short range force) to capture particles. Additionally, the surface area to volume ratio of the present nanomembrane is very high. This increases the probability of interaction between particles and ultrafine nanofibers even in few monolayer thickness (~100-500 nm). This small thickness ensures the volumetric porosity of the ultrafine nanofiber coating remains high and thus the additional pressure drop is negligible.

In one embodiment, FIG. 3 specifically illustrates the manufacturing methodology of nanomembrane layer. 301 is polymer solution input, 302 is rotating cylinder, 302a and 302b are possible configurations of the rotating cylinders, 302c is the capillary instability that forms polymer jets and 302d is the polymer solution covering the rotating cylinder and 302e is the rotating cylinder. 303 is the high voltage (dc) electric field that is connected to the rotating cylinder. 304 is the compressed air source, which is connected to 305, air curtains and/knives and/or nozzles. 305 is grounded and the electric field between 305 and 302 is ~1-5 kV/cm. 306 is the collector membrane. 302 is partially submerged in a polymer bath. As it comes up to open air, the free surface results in capillary instability. On application of high electric field, they form polymer jets, which gets attracted towards the grounded 305, which issues air jet at a very high velocity (subsonic and supersonic). This results in enormous stretching of the polymer jets and results in ultrafine nanofiber getting collected on 306 forming nanomembrane.

In another embodiment, FIG. 4 specifically illustrates an alternate manufacturing methodology of nanomembrane layer. 401 is polymer solution input, 402 is multiple needles creating sharp polymerfinger like instabilities. 403 is the high voltage (dc) electric field that is connected to the needles. 404 is the compressed air source, which is connected to 405, air curtains and/knives and/or nozzles. 405 is grounded and the electric field between 405 and 402 is ~1-5 kV/cm. 406 is the collector membrane. 402 is partially submerged in a polymer bath. As it comes up to open air, the free surface results in capillary instability. On application of high electric field, they form polymer jets, which gets attracted towards the grounded 405, which issues air jet at a very high velocity (subsonic and supersonic). This results in enormous stretching of the polymer jets and results in ultrafine nanofiber getting collected on 406 forming nanomembrane.

Figures 5, 6, 7:
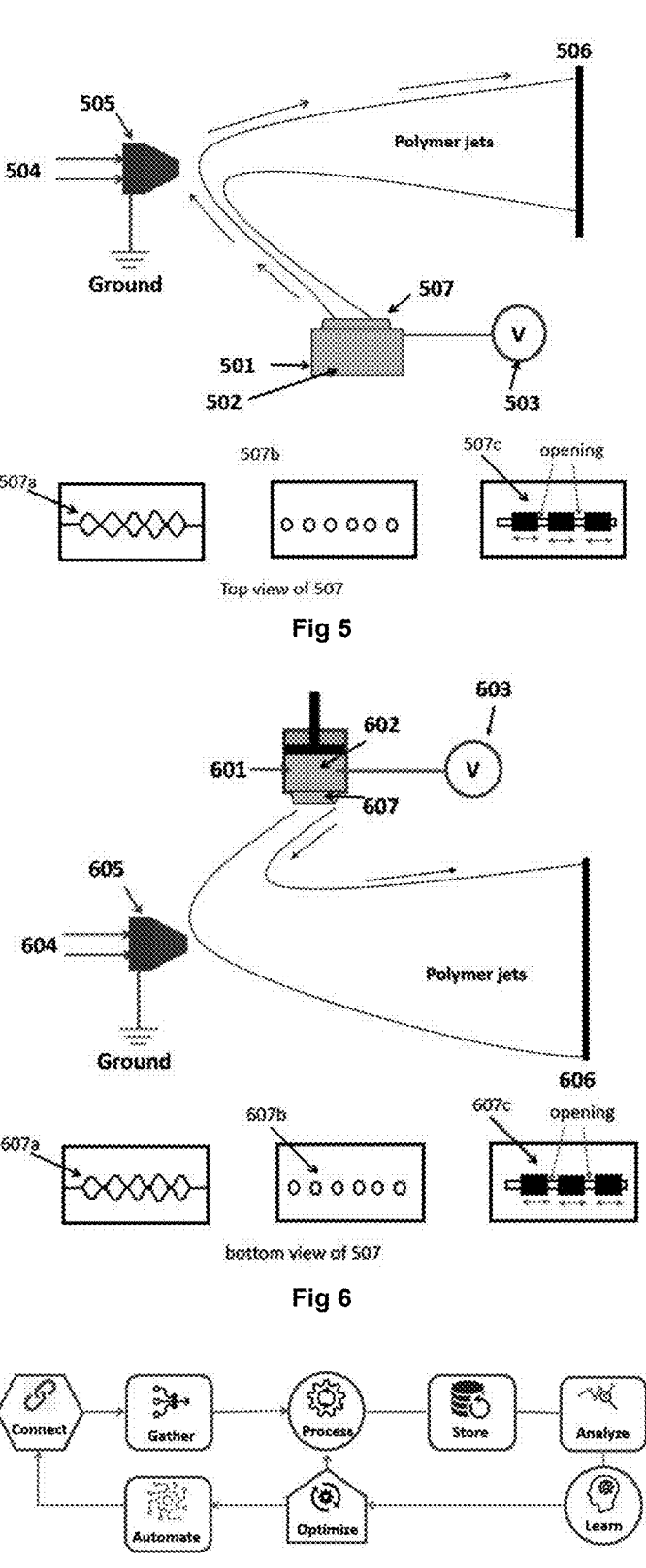
FIG. 5 illustrates an example of nanomembrane production system, where the polymer jet issues from a polymer jet issuing head is shown. Different configurations of head are shown in the form of patterned head and/or needles and/or oscillating stoppers capable of closing and opening slot. The polymer jets are issued against gravity.
FIG. 6 illustrates an example of nanomembrane production system, where the polymer jet issues from a polymer jet issuing head is shown. Different configurations of head are shown in the form of patterned head and/or needles and/or oscillating stoppers capable of closing and opening slot. The polymer jets are issued towards gravity.
FIG. 7 illustrates the flow process to optimize the physics-based machine leaning process that optimize the nanomembrane manufacturing process.

In another embodiment, FIG. 5 specifically illustrates an alternate manufacturing methodology of nanomembrane layer. 501 is polymer solution input and 502 is the polymer reservoir. 503 is the high voltage (dc) electric field that is connected to the rotating cylinder. 504 is the compressed air source, which is connected to 505, air curtains and/knives and/or nozzles. 505 is grounded and the electric field between 505 and 502 is ~1-5 kV/cm. 506 is the collector membrane. 507 is the polymer jet head that can have variety of configurations including 507a and/or 507b and/or 507c. 507a shows the jet head with patterned opening issuing polymer jets, whereas 507b shows jet head with multiple needles issuing polymer jets and 507c shows slot opening with oscillating stoppers capable of closing and opening slot resulting in issuance of polymer jets. On application of high electric field, the polymer jets get attracted towards the grounded 505, which issues air jet at a very high velocity (subsonic and supersonic). This results in enormous stretching of the polymer jets and results in ultrafine nanofiber getting collected on 506 forming nanomembrane. The polymer jets are issued against the gravity.

In another embodiment, FIG. 6 specifically illustrates an alternate manufacturing methodology of nanomembrane layer. 601 is polymer solution input and 602 is the polymer reservoir. 603 is the high voltage (dc) electric field that is connected to the rotating cylinder. 604 is the compressed air source, which is connected to 605, air curtains and/knives and/or nozzles. 605 is grounded and the electric field between 605 and 602 is ~1-5 kV/cm. 606 is the collector membrane. 607 is the polymer jet head that can have variety of configurations including 607a and/or 607b and/or 607c. 607a shows the jet head with patterned opening issuing polymer jets, whereas 607b shows jet head with multiple needles issuing polymer jets and 607c shows slot opening with oscillating stoppers capable of closing and opening slot resulting in issuance of polymer jets. On application of high electric field, the polymer jets get attracted towards the grounded 605, which issues air jet at a very high velocity (subsonic and supersonic). This results in enormous stretching of the polymer jets and results in ultrafine nanofiber getting collected on 606 forming nanomembrane. The polymer jets are issued towards the gravity.

The manufacturing systems described here may be used as stand-alone unit or may be using in conjunction with one another. This will allow further flexibility in design and operation to develop complicated filtration systems. The manufacturing process is optimized by physics driven machine learning process, whose process flow is shown in FIG. 7. Some of the key process variables for the manufacturing process are: polymer viscoelasticity, electric field, air velocity, initial polymer jet diameter, relative distances between air curtains/knives/curtains and the collector and polymer jet origination point, environmental conditions (e.g., temperature, humidity), polymer throughput and inline process specific variables. All of these are included in the manufacturing process. Using computer vision and AI/ML/Edge computing-based platforms the process parameters are optimized against output (fiber size in nanomembrane, filtration efficiency etc.). The process is designed to get better with time.

While different embodiments of the present filtration system are shown and described, it will be appreciated in the filtration industry skilled in the art that performs modifications may be made thereto without departing from the invention in its broader aspects as set forth in the following claims.

REFERENCES

[1] https://www.fortunebusinessinsights.com/protective-face-mask-market-103292

[2] http://www.oecd.org/coronavirus/policy-responses/the-face-mask-global-value-chain-in-the-COVID-19-out-break-evidence-and-policy-lessons-a4df866d/

[3] https://www.fortunebusinessinsights.com/industry-reports/air-filters-market-101676

[4] https://www.grandviewresearch.com/industry-analysis/us-air-purifier-market

[5] https://www.reportsanddata.com/report-detail/ultrafiltra-tion-market

[6] https://css.umich.edu/factsheets/us-wastwater-treatment-factsheet

[7] https://www.watertechonline.com/wastwater/article/155475/what-is-ultrafiltration-and-what-are-ultrafiltration-processes-in-wastewater

[8] Wallace Woon-Fong Leung, Chi Ho Hung; Multilayer nanofiber filter; 2010; U.S. Pat. No. 8,523,971 B2.

[9] Alan Smithies; Durable nanofiber synthetic filter media, 2017, US20190160404A1.

[10] Lei Li, Thomas B Green. Multi-component filter media with nanofiber attachment, 2014, EP2321029A4.

[11] Sumit Sinha-Ray, Suman Sinha-Ray, Alexander L. Yarin, Benham Pourdeyhimi; Journal of Membrane Science 485, 132-150, 2015.

[12] Victor Barinov, Kalle Levon; Controlled electrospinning of fibers, 2012, U.S. Pat. No. 8,282,873B2.

[13] Upma Sharma, Quynh Pham, John Marini, Xuri Yan, Lee Core. Electrospinning process for manufacture of multi-layered structures, 2013, U.S. Pat. No. 9,194,058B2.

[14] Min Wook Lee, Suk Goo Yoon, Alexander L Yarin, Suman Sinha-Ray, Behnam Pourdeyhimi; Electrospinning device, 2016, U.S. Pat. No. 9,469,920B2.

What is claimed is:

1. A filtration system for filtration of fluid, both air and/or liquid, the filter system comprising:
   at least one nanomembrane that includes nanofibers of a polymeric material, wherein a diameter of the nanofibers is in a range of 50 nanometers to 100 nanometers and a thickness of each of the at least one nanomembranes does not exceed 500 nanometers, each of the at least one nanomembranes having a capture efficiency of at least 20-50% for nanoparticles having a diameter in a range of 50 nanometers to 400 nanometers, the at least one nanomembrane positioned between filter membranes and/or coated on a filter membrane.

2. The filtration system of claim 1, wherein the nanofibers comprise polymers selected from a group including: polyvinyl alcohol (PVA), polyacrylonitrile (PAN), polyvinylidene fluoride (PVDF), polyethylene terephthalate (PET), polypropylene (PP), polyethylene (PE), nylon, polyurethane, polystyrene and polycarbonate; or biopolymers selected from a group including: cellulose, cellulose acetate, chitosan, collagen, silk fibroin, alginate and polylactic acid (PLA); or copolymers comprising at least two of the aforementioned polymers or biopolymers.

3. The filtration system of claim 1, wherein the nanomembrane comprises a capture efficiency of at least 40% for nanoparticles having diameters in a range of 50 nanometers to 100 nanometers, a capture efficiency of at least 40% for nanoparticles having diameters in a range of 100 nanometers to 200 nanometers and a capture efficiency of at least 50% for nanoparticles having diameters in a range of 200 nanometers to 400 nanometers.

4. The filtration system of claim 1, wherein the nanomembrane comprises a volumetric porosity of at least 99%, an open pore structure with an average pore size ranging from 1 micrometer to 100 micrometers.

5. The filtration system of claim 1, wherein the nanomembrane adheres to the filtration membrane through intermolecular van der Waals forces without requiring chemical adhesives or bonding agents, thermal bonding processes involving heat treatment above 100° C., plasma treatment or corona discharge surface activation, mechanical fastening or stitching, or solvent-based lamination processes.

* * * * *